United States Patent [19]
Kau

[11] Patent Number: 5,442,560
[45] Date of Patent: Aug. 15, 1995

[54] INTEGRATED GUIDANCE SYSTEM AND METHOD FOR PROVIDING GUIDANCE TO A PROJECTILE ON A TRAJECTORY

[75] Inventor: Shing P. Kau, Seminole, Fla.
[73] Assignee: Honeywell, Inc., Minneapolis, Minn.
[21] Appl. No.: 99,076
[22] Filed: Jul. 29, 1993
[51] Int. Cl.6 .................. G06F 165/00; F41G 7/00
[52] U.S. Cl. .................... 364/453; 364/559; 364/423
[58] Field of Search .............. 364/453, 423, 462, 516, 364/559, 455; 33/321; 244/165, 79, 80

[56] References Cited
U.S. PATENT DOCUMENTS

| | | | |
|---|---|---|---|
| 3,699,316 | 10/1972 | Lopes, Jr. | 235/150.2 |
| 4,012,018 | 3/1977 | Lorell et al. | 244/165 |
| 4,495,850 | 1/1985 | White | 89/1.8 |
| 5,067,084 | 11/1991 | Kau | 364/453 |
| 5,150,856 | 9/1992 | Gaide | 244/3.2 |
| 5,301,114 | 4/1994 | Mitchell | 364/453 |

Primary Examiner—Michael Zanelli
Attorney, Agent, or Firm—Thomas A. Rendos

[57] ABSTRACT

An inertial measurement unit is provided which includes a core inertial measurement unit having accelerometers and gyroscopes aligned along x, y and z axes to provide signals to an onboard computer to determine position of the vehicle upon which they are mounted while in movement. A fourth accelerometer is pivoted perpendicular to the direction of the gravitational field for measuring the gravitational field about the axis upon which it is mounted to provide a reference set of data to an onboard computer prior to movement of the vehicle upon which the system is mounted.

14 Claims, 3 Drawing Sheets

INTEGRATED GUIDANCE SYSTEM AND METHOD FOR PROVIDING GUIDANCE TO A PROJECTILE ON A TRAJECTORY

FIELD OF THE INVENTION

The present invention relates generally to an integrated guidance system having an auxiliary unit to enhance the accuracy of the guidance system, and also relates to a method of providing such guidance. The use of the auxiliary unit permits the use of cheaper and less accurate components in the basic guidance system while maintaining the accuracy of previous more complex and expensive guidance systems.

BACKGROUND OF THE INVENTION

In present-day missile applications it is important to provide data indicative of rotational motion of a missile as well as position and velocity data to a computer on board the missile for the purpose of calculating adjustments in trajectory to arrive at a desired endpoint. Typically, such systems rely upon multiple gyroscopes, one each for providing an indication of rotational motion along the x (roll), y (pitch), and z (yaw) axes of such missiles to the onboard computer. In addition, accelerometers are provided along the same axes as the gyroscopes for purposes of measuring translational motion along the respective axes with the data from both the gyroscopes and the accelerometers being provided to an onboard computer to adjust the trajectory of the missile, in a conventional manner, based on the data received as compared to a calculated endpoint or set of data to arrive at an endpoint. The real-time inflight data is compared to preset data to adjust the trajectory in flight to arrive at the predetermined target destination. An example of the typical systems to which the invention is directed is disclosed in U.S. Pat. No. 5,067,084, which is commonly assigned herewith, and which disclosure is incorporated by reference herein.

In the past, such a combination of units, i.e., accelerometers and gyroscopes, were known as a core inertial measurement unit. Typically, in order to provide a reference prior to launch for calculations being conducted in flight for measurements during the flight, a referenced set of values is provided along each axis relative to rotational position as well as relative to a base gravitational pull, i.e., gravity at sea level, at the launch site. Such base measurements have in the past been provided by gimbaling the inertial measurement unit about at least two axes. Such an arrangement has required a complicated and expensive gimbaling unit, which is essential to ensure missile targeting accuracy.

The systems with complicated gimbaled inertial measurement units have been in use in both intercontinental ballistic missile application as well as in interceptor missile applications, the latter requiring only a lower level of accuracy over short distances. In the case of applications of the prior art inertial measurement unit on intercontinental ballistic missile systems (ICBMs), accuracy was often enhanced by the use of a conventional star sensor which referenced a predetermined celestial body in flight to provide additional data to the onboard computer which would provide further adjustments to the trajectory of the projectile or missile.

In accordance with the present invention, the requirement of the complicated gimbaling mechanisms of the prior art are avoided. Specifically, it is possible to use a nongimbaled, strapdown base inertial measurement unit (IMU) while maintaining the high accuracy of the prior art systems. The invention provides a system which is much simpler to construct and much less costly than the previous systems.

SUMMARY OF THE INVENTION

In accordance with one aspect of the invention, there is provided an inertial measurement apparatus which includes a base inertial measurement unit. The base inertial measurement unit is constructed in a manner for being strapped down in a fixed position within a vehicle, e.g., a projectile, missile or the like. The inertial measurement unit includes at least three gyroscopes mounted for measuring rotational movement of the vehicle along x (roll), y (pitch), and z (yaw) axes of the vehicle. Further, at least three accelerometers are mounted for measuring translational motion of the vehicle along each of the axes. The accelerometers may but need not be mounted along the same axes as the gyroscopes. In order to enhance the accuracy of the base inertial measurement unit which is, when in use, strapped down and includes no gimbaling mechanism, there is provided a separately mounted pivotable accelerometer. The pivotable accelerometer measures the gravitational field along a predetermined axis of the vehicle before launch by being pivoted in a desired manner about the predetermined axis, and thereby providing data relative to the gravitational field at the launch site into the computer. This data is used as a reference to compare to the data from the inertial measurement unit by the computer during flight.

In the case where the device is employed on a vertically launched or mounted unit such as an ICBM, the pivotable accelerometer is constructed for pivoting about the y (pitch) or z (yaw) axis of the vehicle. When the device is used on a interceptor-type missile where a launcher holds the missile on a horizontal plane prior to raising it to a vertical plane prior to launch, the accelerometer is constructed for pivoting about the x (roll) axis of the vehicle to provide the inertial preflight measurement when the vehicle is on the launcher in the horizontal position. The pivotable accelerometer enables calibration to be performed at the launch site. The field calibration capability is able to relieve long term accelerometer accuracy stability requirements by at least two orders of magnitude depending on the specific mission application.

In another aspect, the invention is directed to a method of improving the measurement accuracy of a strapdown inertial measurement unit in a vehicle such as a missile or other type of projectile. The inertial measurement unit is constructed as described with reference to the apparatus discussed previously. Accordingly, with a separately mounted, pivotable accelerometer, the gravitational field at the launch site is measured about a predetermined axis of the vehicle before launch to be used as a reference by a computer on board. When in flight, the preflight measurement is used to calibrate measurement data being generated by the strapdown inertial measurement unit within the vehicle. During flight a comparison is made with the preflight data to adjust the trajectory of the vehicle. In the case of an ICBM, the measurement is conducted by reorienting the fourth accelerometer about the y (pitch) or z (yaw) axis of the vehicle and in the case of an interceptor missile, which is in a horizontal position prior to launch, the measurement is conducted by reorienting the fourth accelerometer about the x (roll) axis of the vehicle.

These and other features and advantages of the invention will be more readily apparent upon reading the following detailed discussion of the invention made with reference to the accompanying drawings.

DETAILED DISCUSSION

Figure 1:
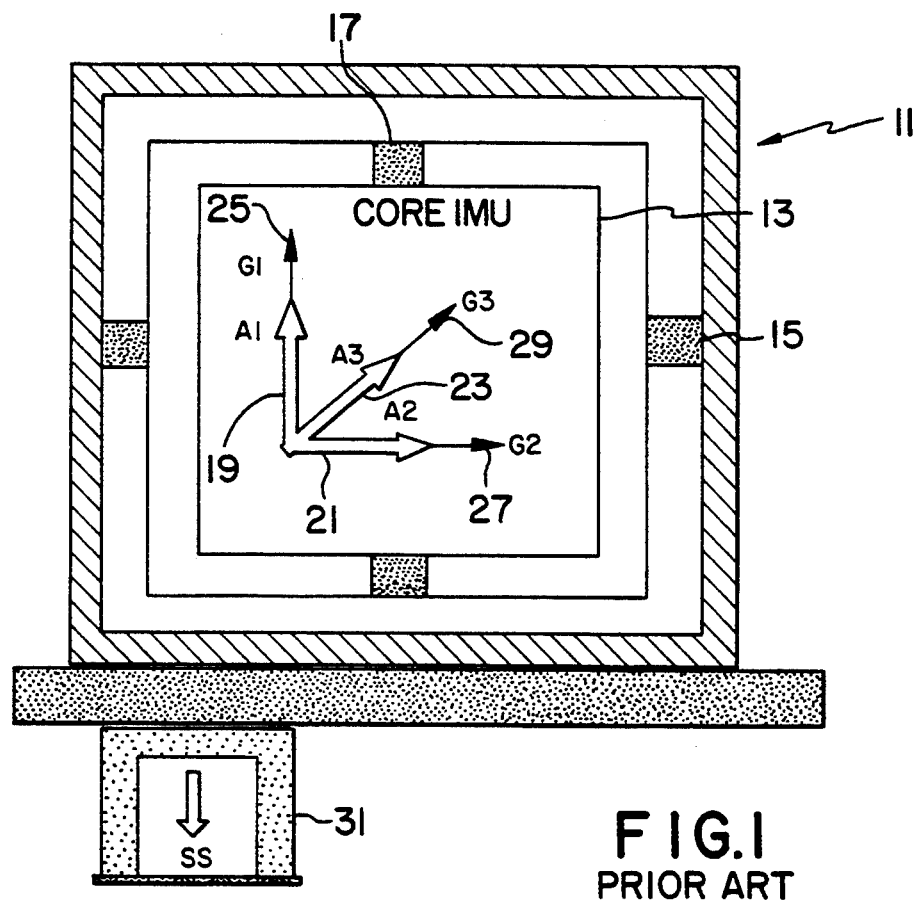
FIG. 1 is a schematic diagram illustrating one version of a prior art inertial measurement unit showing a complex gimbaling mechanism for conducting preflight calibrations, and employing a star sensor, for use, for example, in an intercontinental ballistic missile.

FIG. 1 illustrates generally a prior art inertial measurement unit 11 for use in vehicles, for example, missiles such as intercontinental ballistic missiles. It is noted that throughout the Figures, both with a reference to prior art Figures as well as present invention, like reference numerals will be employed to illustrate like elements. The inertial measurement unit of FIG. 1 is generally designated by reference numeral 11. The unit 11, consists of a core inertial measurement unit 13 which includes various types of sensors along the x (roll), y (pitch), and z (yaw) axes of the unit. Typically, such a unit will employ gyroscopes, for example, ring laser gyroscopes, conventional mechanical gyroscopes or fiber-optic gyroscopes for measuring rotational motion of the vehicle in which the unit 11 is mounted. Thus, there is shown a gyroscope 25 aligned about the x (roll) axis, a gyroscope 27 aligned about the y (pitch) axis, and a gyroscope 29 aligned about the z (yaw) axis. Likewise, accelerometers 19, 21, and 23 are aligned along the same respective axes as the gyroscopes 25, 27 and 29. These accelerometers 19, 21 and 23 serve to measure translational motion of the vehicle.

The unit 13 is mounted on pivots 15 and 17 and prior to launch the unit 13 is rotated in a conventional manner about each pivot and measurements taken of rotation as well as of the gravitational field at the launch position, to provide a reference which is used by the onboard computer to compare to measurements coming from the unit 13 during flight when it is locked in a fixed position. In the case of FIG. 1, it is noted that this type of system 11 is employed on vehicles such as intercontinental ballistic missiles and includes a fixed mounted star sensor 31 which during flight will fix its position by processing the star sensor 31 sighting to a celestial body and the results of the measurement from the star sensor 31 are also fed to the onboard computer to assist in the trajectory adjustment of the vehicle.

Figure 2:
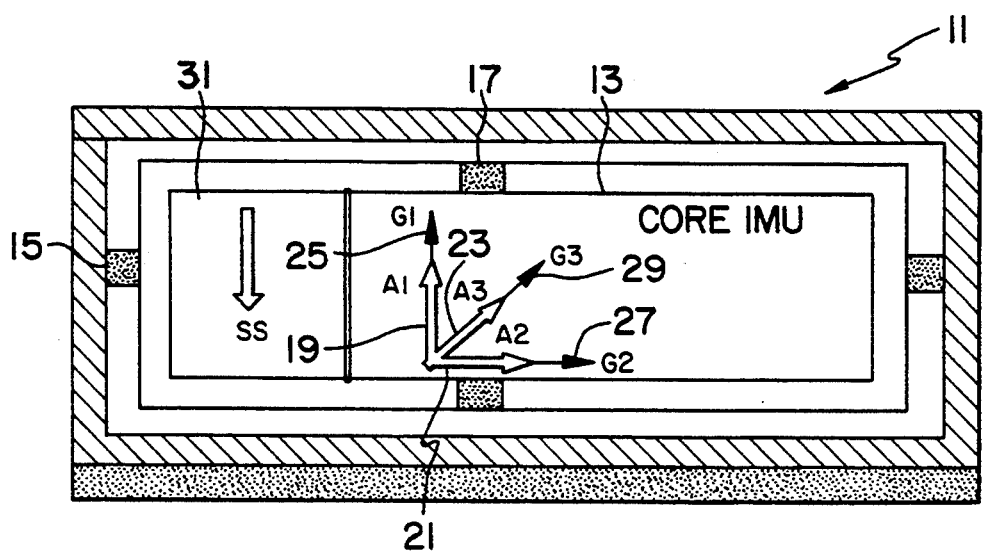
FIG. 2 is a schematic diagram illustrating an alternative prior art configuration similar to FIG. 1, but in which the star sensor unit is also gimbaled within the core inertial measurement unit.

FIG. 2 shows a prior art system similar to that of FIG. 1 except that the star sensor 31 is shown fixed to the core inertial measurement unit 13. It is rotated about the two axes 15 and 17 during preflight calibration but it is only employed during the flight to assist in adjusting and correcting for errors in trajectory measurements.

Figure 3:
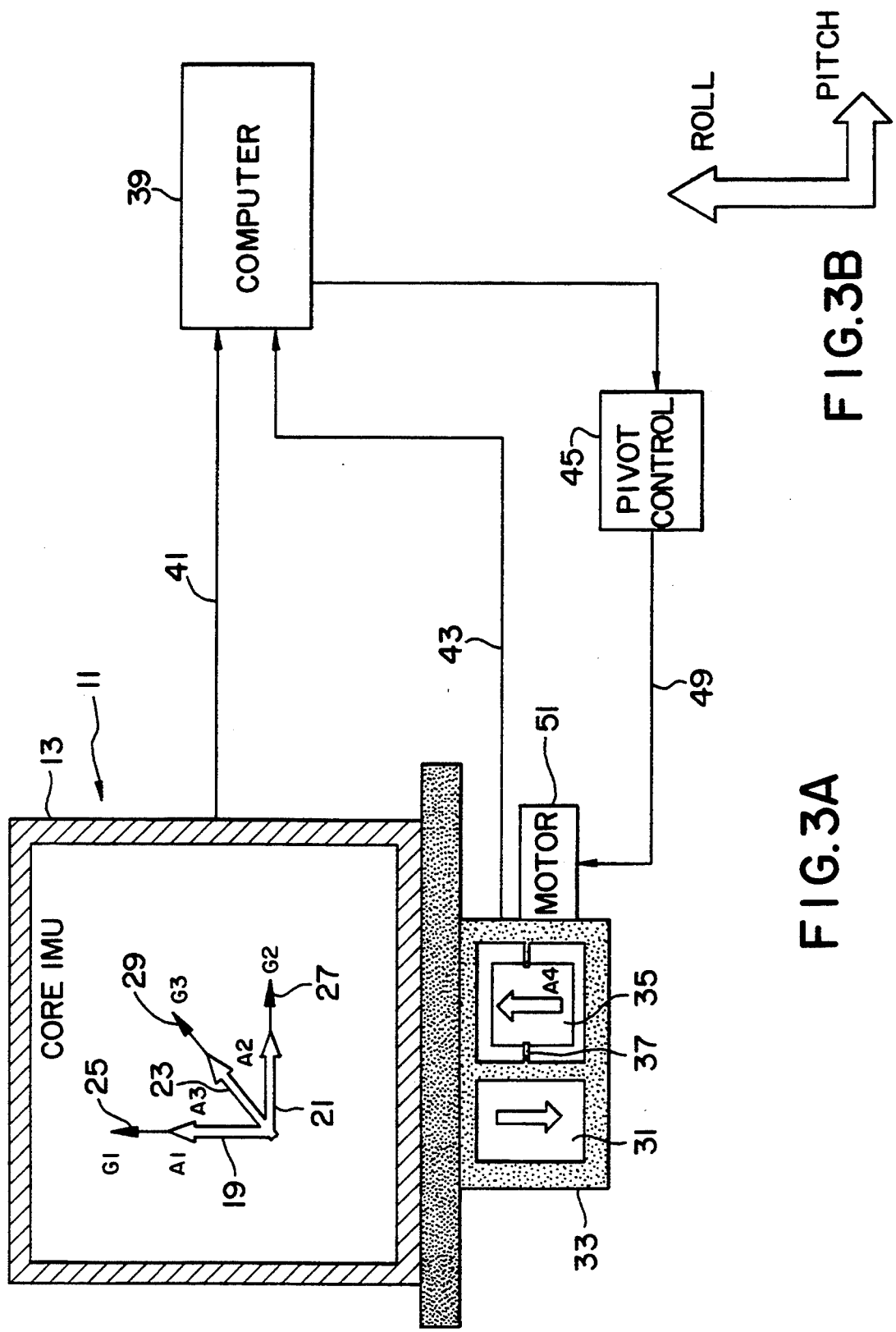
FIG. 3A is a schematic diagram illustrating the base system in accordance with the invention, with a core inertial measurement unit shown strapped down within the system, and with an auxiliary accelerometer shown attached thereto in a pivoted configuration with a motor for pivoting the accelerometer, and showing the various inputs to an onboard computer and pivot control unit.
FIG. 3B is a schematic diagram illustrating the roll and pitch axes of the core inertial measurement unit employed in the invention as mounted within a vehicle relative to FIG. 3A.

The system 11, in accordance with the invention, is generally shown in FIG. 3A which shows a core inertial measurement unit 13 having accelerometers 19, 21 and 23, as well as gyroscopes 25, 27 and 29 mounted therein along the respective axes as in the case with the prior art of FIGS. 1 and 2. In this system 11, the core inertial measurement unit 13 is strapped down in a fixed nonpivotable manner within the vehicle. Typically, the vehicle illustrated by FIG. 3A would be an intercontinental ballistic missile by virtue of the alignment of the system 11 within the vehicle as illustrated by FIG. 3B, which shows the direction of the x (roll) and y (pitch) axes of the system relative to the vehicle. As in the case with the prior art, signals from the core inertial measurement unit 13 are fed through a line 41 to an onboard computer 39 to calculate trajectory and make adjustments for trajectory while in flight. However, as may be appreciated when compared to FIGS. 1 and 2 of the prior art, there is no pivoting arrangement for the core inertial measurement unit 13 so that there is no preflight calibration done off of the unit 13.

In accordance with the invention, a fourth accelerometer 35 is mounted external to the core inertial measurement unit 13 about a pivot 37 and is driven by a motor 51. Prior to launch, the computer 39 controls a pivot control unit 45 which through line 49 feeds signals to a motor 51, for example, a stepping motor, which drives accelerometer 35 to pivot about its pivot 37 to provide the gravitational field measurements through line 43 to the computer 39 prior to launch. In accordance with the invention, the preflight measurements about the pitch (y) axis (which can be about the (z) yaw axis) are sufficient to provide a reference value to the computer 39 such that the signals coming from the core inertial measurement unit 13 to the computer through line 41 while in flight, are sufficient to enable calculation which maintain an accuracy comparable to that of the prior art of FIGS. 1 and 2. The pivot 37 allows the sensitive axis of the redundant accelerometer 35 to be reoriented with respect to gravity for accurate calibration of bias and scale factor errors. During flight the pivot will be locked such that the sensitive axis of the redundant accelerometer is aligned to that of the accelerometer 19 for thrust acceleration measurement. Velocity matching between the redundant accelerometer 35 and the core inertial measurement unit 13 is performed in the onboard computer 39 to transfer the calibration accuracy from 35 to 13.

In the case of the device of FIG. 3A, the measurements are conducted with the vehicle in a vertical alignment. As in the case with the prior art of FIGS. 1 and 2, a star sensor 31 is mounted in a fixed position along with the fourth accelerometer 35 within a separately fixed housing 33 as part of the system 11.

Figure 4:
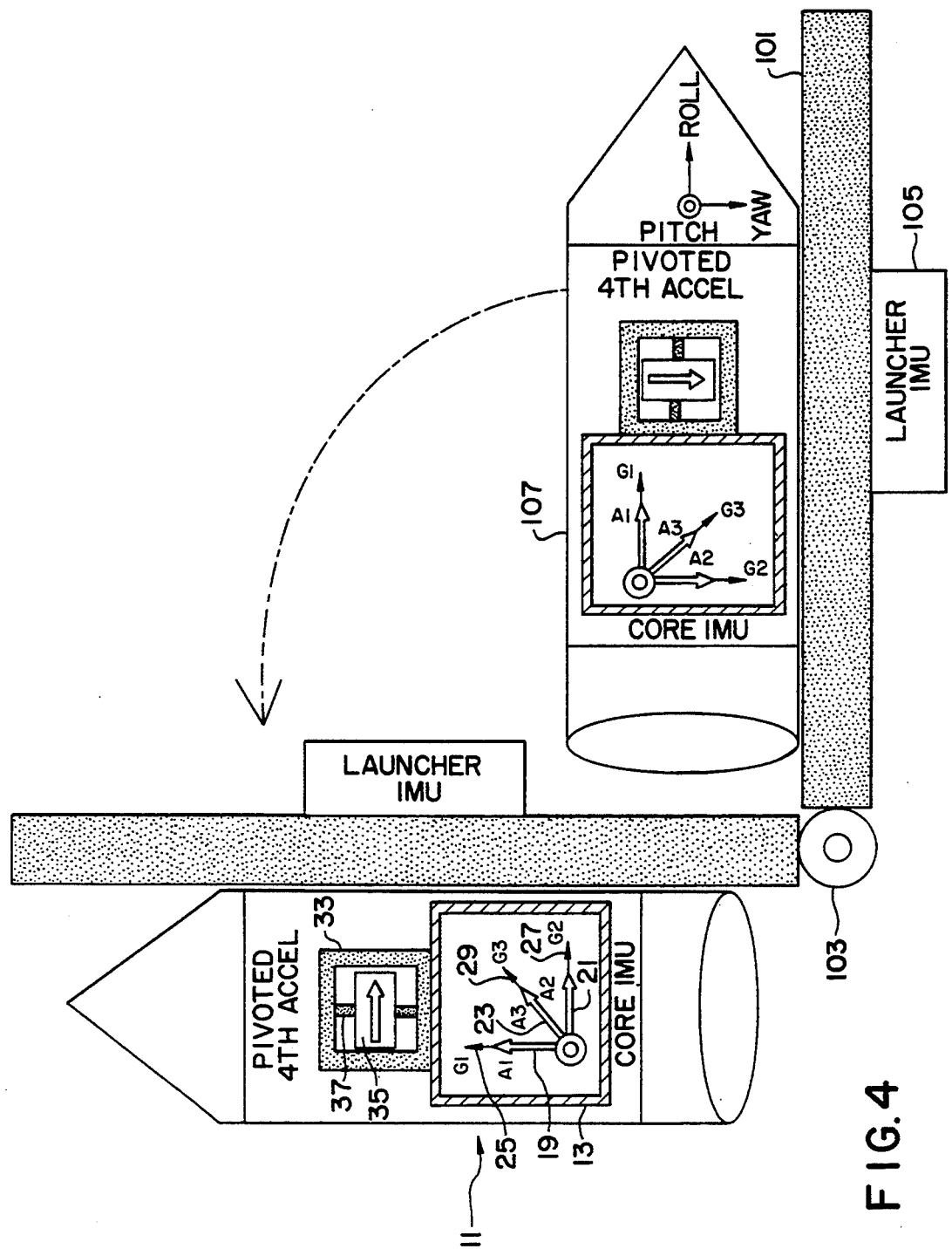
FIG. 4 is a schematic diagram illustrating the measurement unit of the invention as mounted within an interceptor-type missile which is supported on a launcher which is initially in a horizontal position and pivots into a vertical arrangement prior to launch.

As may be appreciated, the system 11 in accordance with the invention, may also be employed in an interceptor-type missile which is launched from a launcher. FIG. 4 illustrates a typical launcher which includes a platform 101 pivotable at a pivot 103 and having a conventional launcher inertial measurement unit 105 attached thereto which also feeds data to be used in calculations relative to launch position by the missile 107. In this case, it will be appreciated that the auxiliary system 33 including the additional accelerometer 35, has the accelerometer pivoted at a pivot 37 which is at 90° to that of FIG. 3A. The reason for this is that the measurements are conducted by accelerometer 35 when the missile 107 is in the horizontal position, as shown by the right hand of FIG. 4. After the measurements are conducted as described with reference to FIG. 3A, the missile is raised into a vertical or semi-vertical position depending upon the trajectory desired for interception as shown by the dashed-curved line, and the preflight measurements then serve as a reference during flight until the missile, which typically also includes a seeker, for example, a radar, a heat sensor or the like, reaches the "basket of acquisition" where the seeker can take over and target a vehicle to be intercepted.

Having described the invention in detail, the following summarizes the advantages provided by the invention:

1. There is provided a pivotable fourth accelerometer which can be calibrated preflight because the sensitive axis (also known as the input axis) can be reoriented with respect to the gravity vector which serves as the calibration reference; and 2. A velocity matching process in which the redundant fourth accelerometer is used as the reference to compare against the core inertial measurement unit measurement which is projected to the sensitive axis of the fourth accelerometer. (During the boost flight the primary acceleration is the booster thrust which is nominally aligned to the missile roll axis. For best performance the sensitive axis of the fourth accelerometer is aligned to the missile thrust axis which is approximately the roll axis. The pivot for the fourth accelerometer makes this alignment possible.) The effect of this velocity matching process is that the core inertial measurement unit, which can not be calibrated preflight, will benefit by the measurement from the fourth accelerometer which is more accurate after the preflight calibration.

The two key elements of this invention is thus the pivoted fourth accelerometer and the velocity matching processing between the redundant fourth accelerometer and the core inertial measurement unit.

Modification and variations of the present invention are possible in light of the above teachings. It is therefore to be understood that within the scope of the appended claims, the invention may be practiced other than is specifically described.

What is claimed is:

1. An inertial measurement apparatus comprising:
   an inertial measurement unit strapped down within a flight vehicle, said inertial measurement unit comprised of at least three gyroscope means for measuring rotational movement of said flight vehicle along x (roll), y (pitch) and z (yaw) axes thereof and at least three accelerometer means for measuring translational motion of said flight vehicle along each of said axes; and
   separate, pivotally mounted accelerometer means for preflight measurement of the gravitational field acting on said flight vehicle along predetermined directions of a sensitive axis of said separate accelerometer means for calibration of bias and scale factor errors, said separate accelerometer means being locked in position for use of said preflight measurement as a matching reference for inflight data being generated by said inertial measurement unit when said flight vehicle is in flight to enhance targeting accuracy of said inertial measurement unit.

2. An apparatus as in claim 1 wherein said separate accelerometer means is pivotally mounted about the y (pitch) axis of said flight vehicle.

3. An apparatus as in claim 2 wherein said flight vehicle is an intercontinental missile having said apparatus mounted therein.

4. An apparatus as in claim 2 wherein said separate accelerometer means is of greater accuracy after preflight measurement than said at least three accelerometer means in said inertial measurement unit.

5. An apparatus as in claim 1 wherein said separate accelerometer means is pivotally mounted about the x (roll) axis of said flight vehicle.

6. An apparatus as in claim 5 wherein said flight vehicle is an interceptor missile launchable from an erectable launcher, with said missile having said apparatus mounted therein.

7. An apparatus as in claim 5 wherein said separate accelerometer means is of greater accuracy after preflight measurement than said at least three accelerometer means in said inertial measurement unit.

8. An apparatus as in claim 1 wherein said separate accelerometer means is of greater accuracy after preflight measurement than said at least three accelerometer means in said inertial measurement unit.

9. An apparatus as in claim 1 wherein said at least three gyroscope means comprises three ring-laser gyroscopes.

10. An apparatus as in claim 1 wherein said separate accelerometer means is connected to a stepping motor for pivoting said separate accelerometer means.

11. An apparatus as in claim 1 further comprising computing means connected to said inertial measurement unit and to said separate accelerometer means for receiving data therefrom to calculate change in position of said flight vehicle wherein said apparatus is to be mounted for guidance thereof, and for calibrating said data based on data input from said separate accelerometer means prior to flight of said flight vehicle.

12. A method of improving the measurement accuracy of a strapdown inertial measurement unit in a flight vehicle, said inertial measurement unit comprising at least three gyroscope means mounted for measuring rotational movement of said flight vehicle along the x(roll), y(pitch) and z(yaw) axes thereof, and at least three accelerometer means mounted for measuring translational motion of said flight vehicle along each of said axes, the method comprising:
   pivoting a separate, pivotally mounted accelerometer means for preflight measurement of the gravitational field along a predetermined axis of the flight vehicle for calibration of bias and scale factor errors; and
   locking in position said separate accelerometer means for use of said preflight measurement to correct for errors in measurement data generated by said inertial measurement unit when said flight vehicle is in flight to enhance targeting accuracy of said inertial measurement unit.

13. A method as in claim 12 wherein said preflight measurement is conducted about the y(pitch) axis of said flight vehicle, with said flight vehicle being an intercontinental missile.

14. A method as in claim 12 wherein said preflight measurement is conducted about the x(roll) axis of said flight vehicle, with said flight vehicle being an interceptor missile, and said preflight measurement being conducted with said interceptor missile on a launcher prior to erection thereof.

* * * * *